US012189799B2

(12) United States Patent
Cui et al.

(10) Patent No.: US 12,189,799 B2
(45) Date of Patent: Jan. 7, 2025

(54) PROVIDING IMAGES WITH PRIVACY LABEL

(71) Applicant: Microsoft Technology Licensing, LLC, Redmond, WA (US)

(72) Inventors: Dehua Cui, Redmond, WA (US); Albert Thambiratnam, Redmond, WA (US); Chenyang Cui, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 233 days.

(21) Appl. No.: 17/291,255

(22) PCT Filed: Dec. 7, 2018

(86) PCT No.: PCT/CN2018/119912
§ 371 (c)(1),
(2) Date: May 4, 2021

(87) PCT Pub. No.: WO2020/113582
PCT Pub. Date: Jun. 11, 2020

(65) Prior Publication Data
US 2022/0004652 A1    Jan. 6, 2022

(51) Int. Cl.
*G06F 21/62*    (2013.01)
*G06F 16/51*    (2019.01)
(Continued)

(52) U.S. Cl.
CPC .......... *G06F 21/6209* (2013.01); *G06F 16/51* (2019.01); *G06F 16/55* (2019.01); *G06V 40/172* (2022.01); *H04L 67/53* (2022.05)

(58) Field of Classification Search
CPC ...... G06F 21/6209; G06F 16/55; G06F 16/51; G06V 40/172; H04L 67/53
See application file for complete search history.

(56) References Cited

U.S. PATENT DOCUMENTS 8,059,815 B2 * 11/2011 Lofgren ............. H04N 1/32347
713/176
2004/0044894 A1    3/2004 Lofgren
(Continued)

FOREIGN PATENT DOCUMENTS

CN    102279909 A    12/2011
CN    102324044 A    1/2012
(Continued)

OTHER PUBLICATIONS

"International Search Report and Written Opinion Issued in POT Application No. PCT/CN18/119912", Mailed Date: Sep. 18, 2019, 10 Pages.
(Continued)

*Primary Examiner* — Vance M Little
(74) *Attorney, Agent, or Firm* — Schwegman Lundberg & Woessner, P.A.

(57) ABSTRACT

A method for providing images, comprising: performing authentication of an entity (1010);obtaining identity information of the entity based on the authentication (1020); obtaining one or more images associated with the entity based at least on the identity information of the entity (1030); and providing the one or more images, wherein each image in the one or more images is attached with a privacy label (1040).

17 Claims, 10 Drawing Sheets

(51) Int. Cl.
    *G06F 16/55*    (2019.01)
    *G06V 40/16*    (2022.01)
    *H04L 67/53*    (2022.01)

(56) References Cited

U.S. PATENT DOCUMENTS

| | | | |
|---|---|---|---|
| 2004/0070678 | A1 | 4/2004 | Toyama |
| 2006/0107297 | A1* | 5/2006 | Toyama ............ H04N 1/00148 707/E17.026 |
| 2007/0150517 | A1* | 6/2007 | Malone ................. H04N 21/84 |
| 2009/0252383 | A1* | 10/2009 | Adam .................... G06V 40/16 715/810 |
| 2012/0331020 | A1* | 12/2012 | Morishita ............... G06F 16/58 707/822 |
| 2016/0055164 | A1* | 2/2016 | Cantarero ............ G06F 16/447 707/740 |
| 2018/0025215 | A1* | 1/2018 | Yousef .................... G06F 16/58 382/118 |
| 2018/0212928 | A1* | 7/2018 | Gerber ................ H04L 63/1425 |
| 2018/0247075 | A1* | 8/2018 | Aistrope ................ G06F 16/51 |
| 2019/0228564 | A1* | 7/2019 | Tan ....................... G06T 15/205 |

FOREIGN PATENT DOCUMENTS

| | | |
|---|---|---|
| CN | 103365869 A | 10/2013 |
| CN | 105260676 A | 1/2016 |
| CN | 108197453 A | 6/2018 |
| CN | 108551550 A | 9/2018 |
| EP | 3407280 A1 | 11/2018 |
| WO | 2018161298 A1 | 9/2018 |

OTHER PUBLICATIONS

"Extended European Search Report Issued in European Patent Application No. 18942481.5", Mailed Date: Jun. 7, 2022, 6 Pages.
Chandra, Dakshak K., et al., "RIPA: Real-Time Image Privacy Alert System", In Journal of IEEE 4th International Conference on Collaboration and Internet Computing (CIC), Oct. 18, 2018, pp. 136-145.
Communication Pursuant to Article 94(3) Received for European Application No. 18942481.5, mailed on Nov. 24, 2023, 05 pages.
Office Action Received for Chinese Application No. 201880092120. 5, mailed on Jul. 31, 2024, 19 pages (English Translation Provided).

* cited by examiner

| CANDIDATE ENTITY ID | CANDIDATE ENTITY PROFILE | CANDIDATE ENTITY IMAGES |
|---|---|---|
| ID_0 | NAME A, PUBLIC FIGURE, FEMALE, ACTRESS... | UNAUTHORIZED V_01<br>SENSITIVE V_02<br>NORMAL V_03 |
| ID_1 | NAME B, PUBLIC FIGURE, MALE, MICROSOFT, ... | NORMAL V_11<br>NORMAL V_12 |
| ID_2 | UNKNOWN, MALE, | NORMAL V_21 |
| ... | ... | ... |
| ID_N | NULL | NORMAL V_N1<br>...<br>MODIFIED V_NM |

FIG 2

PROVIDING IMAGES WITH PRIVACY LABEL

CROSS-REFERENCE TO RELATED APPLICATION

This application is a U.S. National Stage Filing under 35 U.S.C. 371 of International Patent Application Ser. No. PCT/CN2018/119912, filed Dec. 7, 2018, and published as WO 2020/113582 A1 on Jun. 11, 2020, which application and publication are incorporated herein by reference in their entirety.

BACKGROUND

There are plenty of images of people in the current Internet. Usually, such images show faces of people. Sometimes, an image showing a face of a person may be published to the Internet by the person who has portraiture right of the image; but sometimes, such image may be published by others without permission. Most time, people may don't know where their images are uploaded and/or published to in the Internet. In some cases, privacy of people cannot be protected due to the image published in the Internet.

SUMMARY

This Summary is provided to introduce a selection of concepts that are further described below in the Detailed Description. It is not intended to identify key features or essential features of the claimed subject matter, nor is it intended to be used to limit the scope of the claimed subject matter.

Embodiments of the present disclosure propose method and apparatus for providing images. In some implementations, authentication of an entity may be performed. Identity information of the entity may be obtained based on the authentication. One or more images associated with the entity may be obtained based at least on the identity information of the entity. The one or more images may be provided, wherein each image in the one or more images is attached with a privacy label.

It should be noted that the above one or more aspects comprise the features hereinafter fully described and particularly pointed out in the claims. The following description and the drawings set forth in detail certain illustrative features of the one or more aspects. These features are only indicative of the various ways in which the principles of various aspects may be employed, and this disclosure is intended to include all such aspects and their equivalents.

BRIEF DESCRIPTION OF THE DRAWINGS

The disclosed aspects will hereinafter be described in connection with the appended drawings that are provided to illustrate and not to limit the disclosed aspects.

FIG. 2 illustrates an exemplary entity index database according to an embodiment.

DETAILED DESCRIPTION

Figure 1:
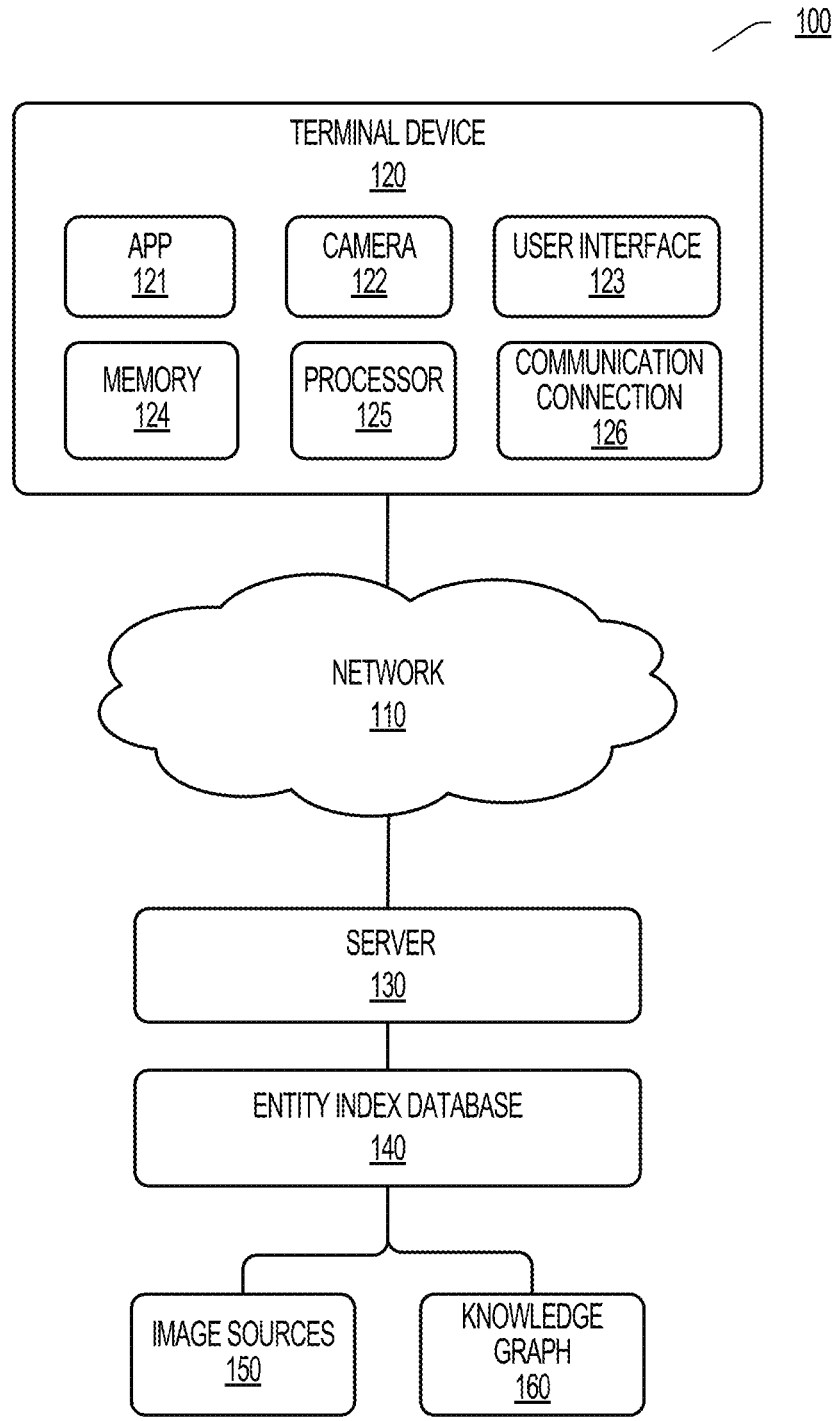
FIG. 1 illustrates an exemplary architecture of a system for providing images through network according to an embodiment.

The present disclosure will now be discussed with reference to several example implementations. It is to be understood that these implementations are discussed only for enabling those skilled in the art to better understand and thus implement the embodiments of the present disclosure, rather than suggesting any limitations on the scope of the present disclosure.

Nowadays, there are massive images showing faces of people in the Internet. Most of images with faces of people may be not published by the person himself/herself who has right of portrait for the image. Sometimes, people may don't want to publish some images to public, for example, images showing their kids; images showing their negative image, such as the images showing person being drunk or smoking or images showing face of an actress without makeup; images modified through deep fake, and so on. However, people may don't know where such images are uploaded or published to in the internet. It may cost lots of time for people to search all of their images and it may be difficult to find their images which may be not intended to be published in the internet.

Embodiments of the present invention propose to provide images with privacy labels associated with an entity. Herein the images may include photographs, pictures, portrayal, and so on. The images with privacy labels may be stored in a database in advance or may be obtained and/or processed from internet in real time. Herein the database may include an entity index database, which comprises ID of respective candidate entity, profile information of respective candidate entity, and images of respective candidate entity. The database may be constructed by leveraging any face recognition technique and search engine to collect and store a plurality of personal images in the internet.

The privacy labels may indicate that the images belong to at least one category of following: unauthorized category, sensitive category, modified category and normal category. As used herein, the unauthorized category may indicate that the image is, for example, not authorized to publish, published outside of a specified location, published outside of a specified time period, or published outside of a specified event. The sensitive category indicates that the image may include sensitive content, for example, with kids, smoking or drunk, uglified appearance, etc. The modified category indicates that the image may be generated through modifying an original image, for example, by editing the original image, or may be a faked image. The normal category indicates any other image which is not identified as unauthorized, sensitive and modified category.

Prior to providing the images with privacy labels associated with an entity, the entity may need to be authenticated.

The authentication may be initiated by a user who is asking for the images associated with the entity or by an application for providing the images. Herein, the user asking for the images associated with an entity may be the entity itself or an agent for the entity. Herein, the agent for the entity may be also referred to an assistant for the entity and may represent any party who has authorization certificate of the entity. For example, the agent for the entity may be a real person or a visual person, such as intelligent robot, computer device, etc., who is authorized by the entity. The authentication may be implemented by any appropriate authentication technology, for example, through at least one of a pair of user ID and password, dynamic token or password, USB key, biometric identification, and so on. By providing images with privacy labels to an associated entity or its agent through the present method or system, the images of the associated entity may be checked and/or managed. In some examples, the entity or its agent may request the application to delete some images with certain privacy labels from the image sources. In some other examples, the entity or its agent may request the application to provide links to image sources of one or more images, and the entity and/or its agent may contact the image sources through the respective link to delete certain images from the image sources, if desired. Through the embodiments of the present disclosure, the privacy of an entity may be protected.

FIG. 1 illustrates an exemplary architecture of a system 100 for providing images through network according to an embodiment.

In FIG. 1, a network 110 is applied for interconnecting among a terminal device 120 and a server 130.

The network 110 may be any type of networks capable of interconnecting network entities. The network 110 may be a single network or a combination of various networks. In terms of coverage range, the network 110 may be a Local Area Network (LAN), a Wide Area Network (WAN), etc. In terms of carrying medium, the network 110 may be a wireline network, a wireless network, etc. In terms of data switching techniques, the network 110 may be a circuit switching network, a packet switching network, etc.

The terminal device 120 may be any type of electronic computing devices capable of connecting to the network 110, accessing servers or websites on the network 110, processing data or signals, etc. For example, the terminal device 120 may be desktop computers, laptops, tablets, smart phones, AI terminals, etc. Although only one terminal device is shown in FIG. 1, it should be appreciated that a different number of terminal devices may connect to the network 110.

In an implementation, the terminal device 120 may comprise an application (APP) 121, a camera 122, a user interface 123, a memory 124, a processor 125, and one or more communication connection 126 for connecting to the network 110.

The application 121 may include any application which can receive input from a user and provide images associated with an entity. The application 121 may be a dedicated application for providing images with privacy labels or a common third party application capable of providing images with privacy labels.

The camera 122 may capture images from environment, including images of a user of the terminal device 120.

The user interface (UI) 123 may be used to present images. The images may be attached with privacy label and be presented to users. The UI 123 may be specific to the application 121 in the terminal device 120, or be incorporated in a third-party application, such as, Facebook, Instagram, LinkedIn, Twitter or any other social network applications.

The memory 124 may be one or more devices for storing data, which may comprise readable-only memory (ROM), random access memory (RAM), magnetic RAM, core memory, magnetic disk storage medium, optical storage medium, flash memory, and/or other machine readable medium for storing information. The term of "machine readable medium" may comprise but not be limited to portable or fixed storage, optical storage, wireless channel and various other medium for storing, containing or carrying instructions and/or data.

The processor 125 may include any quantity of processing units, and is programmed to execute computer-executable instructions for implementing aspects of the disclosure. In some examples, the processor 125 is programmed to execute computer-executable instructions stored in the memory 124 to implement method such as illustrated in accompanying FIG. 10.

The communication connection 126 may comprise wireless connection or wired connection to make the terminal device 120 connecting to the network 110 or any other device.

The server 130 may connect to the database 140. Although not shown in FIG. 1, the server 130 may incorporate the database 140. The server 130 may provide data or applications to the terminal device 120. As one example, the server 130 may be a web server providing data over the web. The server 130 may provide the data over the web to the terminal device 120 through the network 110.

The database 140 may include an entity index database, which comprises ID of respective candidate entity, profile information of respective candidate entity, and images of respective candidate entity. The data in the entity index database 140 may be collected or obtained from image sources 150 and/or knowledge graph 160.

The image sources 150 may include any source which can provide images, for example, social websites, search websites, public and/or personal websites, and/or applications, and so on.

Herein, the knowledge graph 160 may refer to a single knowledge graph or a plurality of knowledge graphs in various domains. The knowledge graph 160 may be established from various websites on the network, such as, Facebook, Linkedin, Twitter, Wikipedia, and so on. The knowledge graph 160 may include any possible knowledge graph, for example, Satori, Knowledge Vault, Schema, Graph Search, and so on.

It should be understood that, all components shown in FIG. 1 may be exemplary, and any components in the terminal device 120 may be added, omitted or replaced in FIG. 1 depending on specific application requirements.

FIG. 2 illustrates an exemplary entity index database 200 according to an embodiment.

The entity index database 200 may include several entity index items, for example, an entity index item 210 shown in FIG. 2, which comprises candidate entity ID, candidate entity profile and candidate entity images. Herein the candidate entity may comprise any entity collected for constructing the entity index database 200, which may be used to be compared with a requested entity to find out a matched candidate entity corresponding to the requested entity.

As shown in FIG. 2, the candidate entity ID may be assigned to a candidate entity randomly or in sequence. It should be appreciated that although the candidate entity ID is shown in a form of ID_0, ID_1, ID_2, ..., ID_n, it may be in any suitable form to indicate a respective candidate entity.

The candidate entity profile may comprise any profile information collected from or generated based at least on a knowledge graph, for example, the knowledge graph 160. It may comprise any personal information of the candidate entity. For example, the candidate entity profile may comprise but not limited to the entity's name, gender, age, profile photo, home address, employer information, occupation, famous degree, such as a public figure or an ordinary person, and so on. In some examples, these entity profile information may be represented in a form of feature vector.

The candidate entity images in each entity index item of the entity index database 200 may comprise a plurality of images associated with the candidate entity with unique entity ID along with privacy label and/or a feature vector for each image. For example, as shown in FIG. 2, the candidate entity images for candidate entity assigned ID_0 may be shown as images each with privacy label and feature vector $V\_nm$ which represents face features of each image, such as {image, unauthorized, $V\_01$}, {image, sensitive, $V\_02$}, {image, normal, $V\_03$}.

It should be appreciated that, although the candidate entity image is shown in a form of group {image, privacy label, feature vector}, it may be shown as an image on which attached with privacy label, feature vector, and may also be attached with or be provided along with any other features, for example, view-count and/or share-count, a link to image source, and/or a publish chain for respective image. The view-count, share-count and/or the link to image source may be obtained from an image source of each image through any extraction model and be attached to the candidate entity image or provided along with candidate entity image. The publish chain of an image may be represent as a site ordered list for publishing and broadcasting the image. In some examples, the site may be also referred to a web-page. The publish chain of an image may be obtained or determined, for example, through a search engine by obtaining "source" of the image from associated sites and cascading links or name of the sites to form the site ordered list. The publish chain of an image may be attached to the image or provided along with the image. For example, an image i may be published on site A at first, and then referenced and/or copied by site B and forwarded to one or more other sites, such as site C, site D .... The publish-chain for this image i may be represented as site A-site B-site C-site D ....

In some examples, the image in such group may be not stored in the entity index database but stored in other database or cloud and be represented by a corresponding feature vector along with a link to the image. In some examples, the privacy label may be attached to the image through any suitable manner, for example, being watermarked on the image, and attached as a note around the image, and so on. In some other examples, the privacy label may be shown as A, B, C, D level, each level indicating the image belonging to what category, such as A level representing unauthorized category, B level representing sensitive category, C level representing modified category and D level representing normal category.

It should be appreciated that, the structure of the entity index database 200 shown in FIG. 2 is just exemplary, any other structure for embodying entity profile or identity information and entity images may be possible for the present disclosure.

Figure 3:
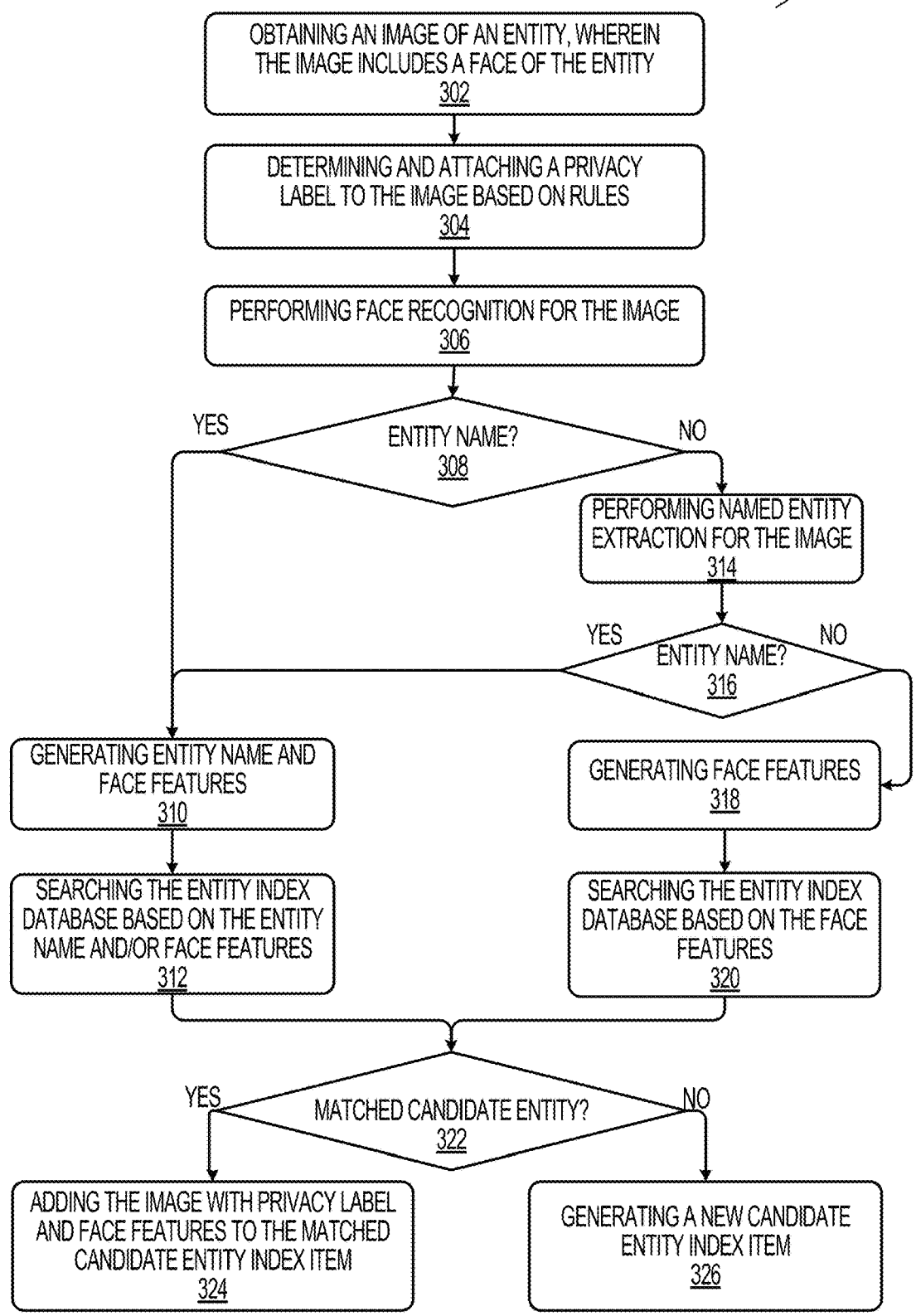
FIG. 3 illustrates an exemplary process for constructing an entity index database according to an embodiment.

FIG. 3 illustrates an exemplary process 300 for constructing an entity index database according to an embodiment.

At 302, an image of an entity may be obtained from one or more image sources, such as captured from internet, social network, and any site which can publish images, or provided by the one or more image sources. The image of the entity may include a face of the entity, which can indicate the identity of the entity. In an implementation, images may be obtained as many as possible through one or more search engines from internet and be processed through a face detection model. The face detection model may be implemented through an object detection model, such as Region Convolutional Neural Network (RCNN), fast-RCNN, faster-RCNN or Single Shot MultiBox Detector (SSD). For example, it may add 5 landmarks to the face recognition model to predict coordinates of two eyes, one nose and mouth's left and right to recognize a face of an entity.

At 304, a privacy label for the image may be determined based on at least one rule and attached to the image to generate an image with privacy label. For example, the privacy label may be determined through a privacy label model based at least on the image and the at least one rule, for example, a multi-label classifier with machine learning, such as supervised learning.

In some examples, the privacy label may identify the image as at least one of unauthorized category, sensitive category, modified category and normal category. In some examples, the unauthorized category may indicate that the image is: not authorized to publish, published outside of a specified location, published outside of a specified time period, or published outside of a specified event. In some examples, the sensitive category indicates that the image includes sensitive content. In some examples, the modified category indicates that the image is generated through modifying an original image. In some examples, the normal category indicates that the image is an image except those identified as unauthorized, sensitive and modified.

The at least one rule may comprise a rule associated with authorization state of each image, a rule associated with sensitive content contained in each image, and a rule associated with modification state of each image. For example, the rule associated with authorization state of each image may include at least one of following rules: whether the image is from a source listed in a whitelist provided by a user; whether the image is allowed to be published to a specified site location, event, or time period. In some examples, if there is no whitelist provided by a user, then any image may be considered as unauthorized. In some other examples, if any image may be published outside the specified site location, event, or time period, it may be considered as unauthorized. For example, if the specified event is Oscar, then the image published not for Oscar Awards may be considered as unauthorized. In an implementation, the rule associated with sensitive content contained in each image may define a list of sensitive types or tags through a classification model, for example, images showing family, images showing kids, images showing the entity being ugly, images showing the entity drunk and/or smoking, etc. The rule associated with modification state of each image may include at least one of following rules: whether the current image is modified as compared with an original image; whether the current image is modified maliciously through a malicious modification detection by a deep-learning based model; whether the current image is edited through an editing detection by a deep-learning based model. In some examples, the original images may be provided by a user or the entity itself. In some examples, a deep-leaning based model may be trained to predict whether an image is modified maliciously by collecting unmodified images as positive examples, and modified picture as negative examples. In some examples, the deep-learning based model may be trained from raw pixels to learn whether the current image is edited.

At 306, face recognition may be performed for the image. For example, the face recognition may be performed through a face recognition model. For example, when receiving an image, a feature vector may be extracted by a face embedding model implemented in the face recognition model and be projected through softmax layer to probabilities of entity names, as shown later in FIG. 4. An entity name with highest probability may be selected as the face recognition result for the face in the image. In other examples, other entity name with a probability other than the highest probability may be selected based on different settings. In some examples, the face recognition model may include a recognition model for specific group, for example, a celebrity recognition model for celebrities by utilizing MS-Celeb-1M, Rekognition, and so on.

At 308, if an entity name can be generated through the face recognition on the image at 306, then the process may move to 310. If an entity name cannot be generated, then the process may move to 314.

At 310, an entity name and face features for the face in the image may be generated. In some examples, the face features may be represented by a feature vector or feature vectors.

At 312, a search may be performed to the entity index database based at least on the generated entity name and/or the face features, to find a matched candidate entity with the entity in the obtained image at 302.

At 314, if an entity name cannot be generated through applying a face recognition model on the image, then a named entity extraction may be performed for the image through a named entity extraction model, to extract an entity name from an image source, site, or webpage showing the image. In some examples, the named entity extraction model may be implemented through Natural Language Processing (NLP) techniques, such as Bidirectional Long Short-Term Memory (Bi-LSTM), Bidirectional Encoder Representation from Transformers (BERT) model, and so on.

At 316, if an entity name can be generated through the named entity extraction at 314, then the process may move to step 310 to generate an entity name and face features for the image. If an entity name cannot be generated through the named entity extraction, then the process may move to step 318 to generate face features. In some examples, if an entity name cannot be generated, then a face grouping model may be utilized to collect images with same or similar face features together as a group of entity images without entity name or entity profile, such as an entity index item 210 and an entity index item assigned ID_2 shown in FIG. 2. Herein each entity index item may represent one entity. In some examples, the face grouping model may be implemented, for example, by using a density peak clustering algorithm, which may cluster several images into one group. In some examples, those entity images, among which difference may be equal to or less than a threshold, may be clustered into a group corresponding to an entity, which means that those entity images may be associated with the same entity.

At 320, a search may be performed to the entity index database, such as entity index database 200, based on the generated face features to find a matched candidate entity with the entity in the obtained image at 302.

At 322, if there is a matched candidate entity, then the process may move to step 324. At 324, the obtained image with determined privacy label and generated face features may be added to "candidate entity images" portion in the entity index item of the matched candidate entity.

If there is no matched candidate entity, then the process may move to operation 326. At 326, a new entity index item for a new candidate entity may be generated by including the obtained image with privacy label, face features, and possible entity name.

It should be appreciated that, although the entity name may be generated and included in the entity index item, any other entity profile information may also be generated and included in the entity index item through any face recognition and/or information extraction techniques, for example from user profile and/or from knowledge graph.

Figure 4:
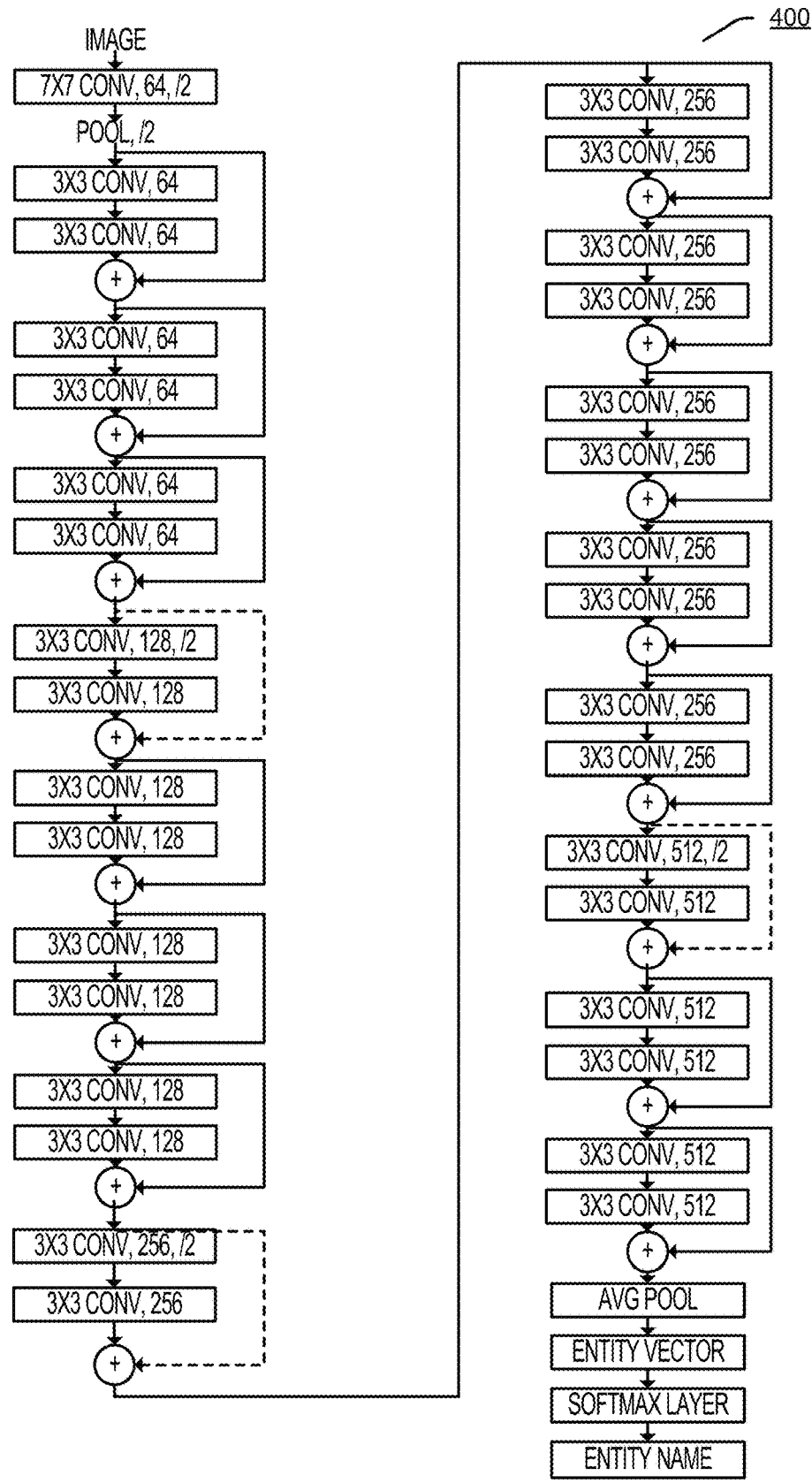
FIG. 4 illustrates an exemplary face recognition model according to an embodiment.

FIG. 4 illustrates an exemplary face recognition model 400 according to an embodiment. The face recognition model 400 may be implemented by a neural network structure, for example, ResNet, DenseNet, and so on. Herein a 34 layer ResNet for encoding an image of an entity for the neural network structure may be shown as an example, which may provide a relative good accuracy and fast training/testing.

In FIG. 4, for example, "3*3 conv, 64" denotes that there are 64 filters, and each filter has a convolutional kernel or function and is in a scale of 3*3 pixels. "/2" denotes a double stride. "avg pool" denotes an average pooling operation. Output of the average pooling operation is an entity vector which is a dense vector representation of the input image.

The entity vector may be further provided to a softmax layer. The softmax layer may output an entity name according to different entity name classifying or selecting strategies. For example, an entity name having highest probability or highest value or having a value satisfying a condition or threshold may be selected to be outputted. The entity name may be represented in a form of a keyword, a feature vector or feature vectors.

The face recognition model 400 may perform face recognition on images. For example, when obtaining an image, face recognition may be performed on images through the face recognition model 400, so as to obtain an entity name of the entity shown in the image.

It should be appreciated that the ResNet is an exemplary technique that can be adopted in image recognition, and any other techniques may be adopted in image recognition, such as, DenseNet, AlexNet, GoogleNet, VGG-Net, etc.

In some embodiments, regions of interest (RoIs) of an image may be identified, and the face recognition model 400 may further perform face recognition on RoIs to obtain entity name of the entity shown in the RoIs. Herein, "RoI" may refer to a face region in an image showing more than one person, each having a face shown in the image. For example, assuming that there are two different persons in an image. Face regions of these two different persons may represent different entities having different names. It would be beneficial for understanding which name does the entity on the image have, if these two face regions can be identified and a name of each entity represented by each face region can be determined.

Figure 5:
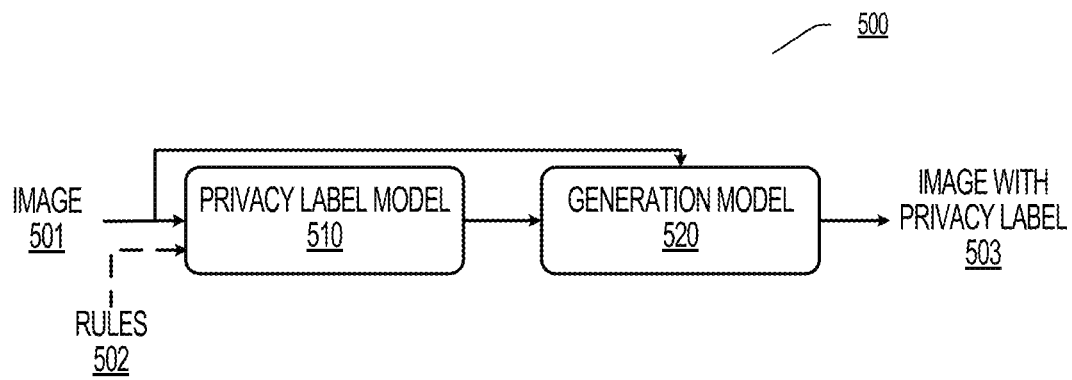
FIG. 5 illustrates an exemplary system for generating an image with a privacy label according to an embodiment.

FIG. 5 illustrates an exemplary system 500 for generating an image with a privacy label according to an embodiment. The system 500 may implement the operation 304 in FIG. 3.

As shown in FIG. 5, an image 501 is provided to a privacy label model 510 and a generation model 520. The privacy label model 510 may determine a privacy label for the image 501 based on at least one rule 502. The rule 502 may be provided to the privacy label model 510 from other component or may be pre-stored in the privacy label model 510. The privacy label model 510 may provide the generated privacy label to a generation model 520. The generation model 520 may attach the privacy label provided to the image 510, to generate an image with privacy label 503.

Figure 6:
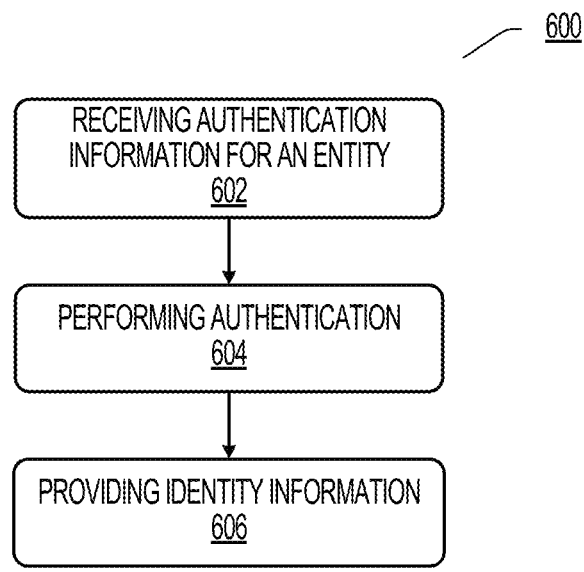
FIG. 6 illustrates an exemplary process for performing authentication on an entity according to an embodiment.

FIG. 6 illustrates an exemplary process 600 for performing authentication on an entity according to an embodiment.

At 602, authentication information for an entity may be received. Herein, the authentication information may be provided by a user, who is the entity or an agent for the entity, or may be obtained from a third-party application through the user logging on the third-party application successfully. The authentication information may comprise at least one of the following: a pair of username and static password, dynamic password, token, USB key, digital signature, biometric recognition information, and so on.

At 604, authentication may be performed based on the authentication information. In some examples, when the authentication information for the entity is biometric recognition information of the entity, for example, a face image of the entity obtained through a camera, performing authentication may include performing face liveness detection to determine whether the obtained image is a live photo. In some examples, when the authentication information is provided by a user, who is an agent for the entity and the agent cannot pass the authentication through biometric recognition, an authorization information for the agent from the entity may be required, for example, an authorization certificate, a power of attorney, a notarization certificate, and so on. In such examples, the authentication may be performed through at least authorization information verification. In some examples, when the authentication information is obtained from a third-party application, the authentication may be performed based on a third-party authentication. For example, if the authentication on the third-party application for the entity is successful, then the authentication for the entity herein may be considered as successful.

At 606, identity information of the entity may be provided based on the authentication. For example, the identity information may comprise at least one of: identity description of the entity and identity image of the entity. In some examples, when the authentication information comprises a face image, the identity information may be obtained directly from the face image through a face recognition model, such as identity name, identity image, which may be just an image or may be represented by image features and/or both. Herein, the image features may also be referred as face features. In some other examples, when the authentication information comprises other information other than the face image, the identity information may be obtained from user profile, for example, a user profile in a knowledge graph or in a third-party application, etc.

It should be appreciated that, the authentication process and identity information shown above in connection with FIG. 6 may be just exemplary, any other authentication manner and identity information may be possible for the present disclosure.

Figure 7:
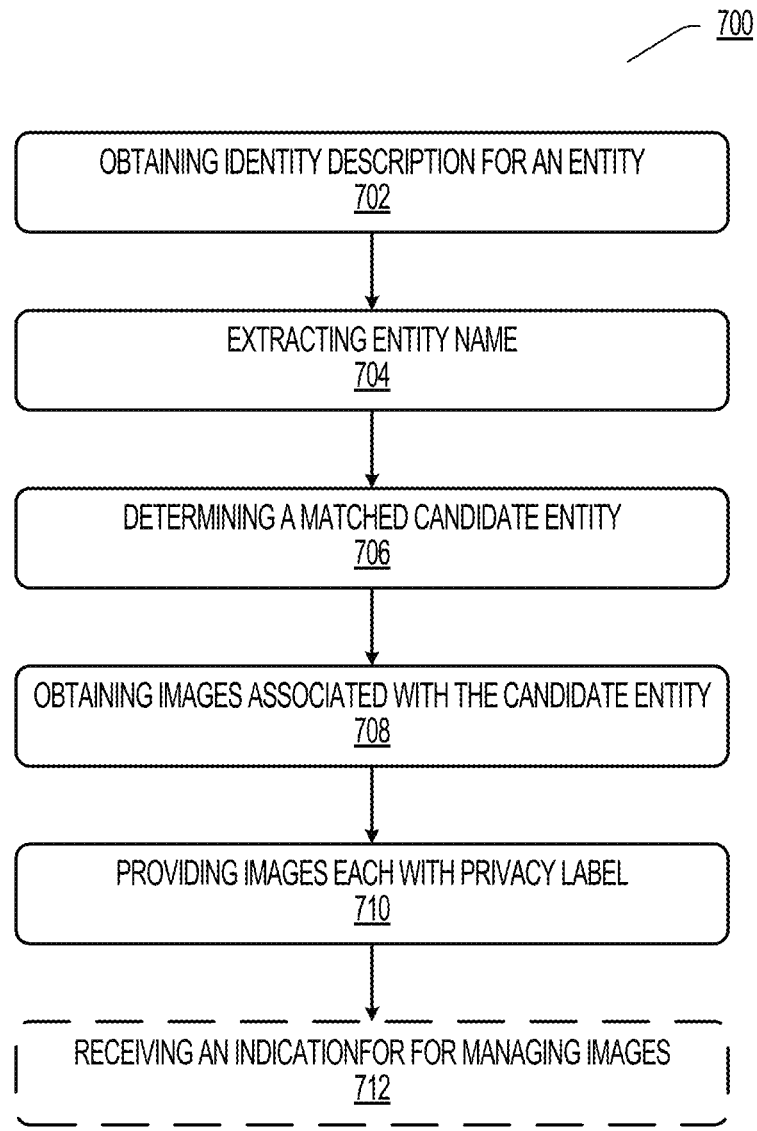
FIG. 7 illustrates an exemplary process for providing images with privacy label according to an embodiment.

FIG. 7 illustrates an exemplary process 700 for providing images with privacy label according to an embodiment. The exemplary process 700 may be performed based on identity description in the identity information provided, for example, from operation 606 in FIG. 6 and may implemented by an independent application, an application in coordination with a third party application, or a third party application. For example, the independent application may include an application dedicated for providing images with at least privacy label. The third party application may include social application, search application and so on, such as Bing, Facebook, Linkedin, Instagram, Twitter, etc.

At 702, identity description for an entity may be obtained. Herein the identity description for an entity may be text description for profile of the entity, for example but not limited to, the entity's name, gender, age, home address, employer information, occupation, famous degree, such as a public figure or an ordinary person, and so on.

At 704, an entity name may be extracted from the identity description. The extraction operation may be performed through any possible feature extraction model or technique. The entity name may be extracted in a form of keyword or feature vector.

At 706, a matched candidate entity may be determined based on the extracted entity name. In some examples, the determination may comprise: selecting a candidate entity name through a keyword matching algorithm from the extracted entity name; determining a candidate entity corresponding to the selected candidate entity name as the matched candidate entity. In some other examples, the determination may comprise: computing a feature vector difference between the extracted entity name and a candidate entity name in an entity index item; comparing the feature vector difference with a threshold; determining one or more candidate entity names of which the feature vector difference being less than the threshold; selecting at least one candidate entity name from the determined one or more candidate entity names based on a ranking rule; selecting at least one candidate entity corresponding to the at least one selected candidate entity name as at least one matched candidate entity.

At 708, one or more images associated with the candidate entity may be obtained from the entity index database. In particular, the images may be obtained from the "candidate entity images" portion in the entity index database.

Figure 9:
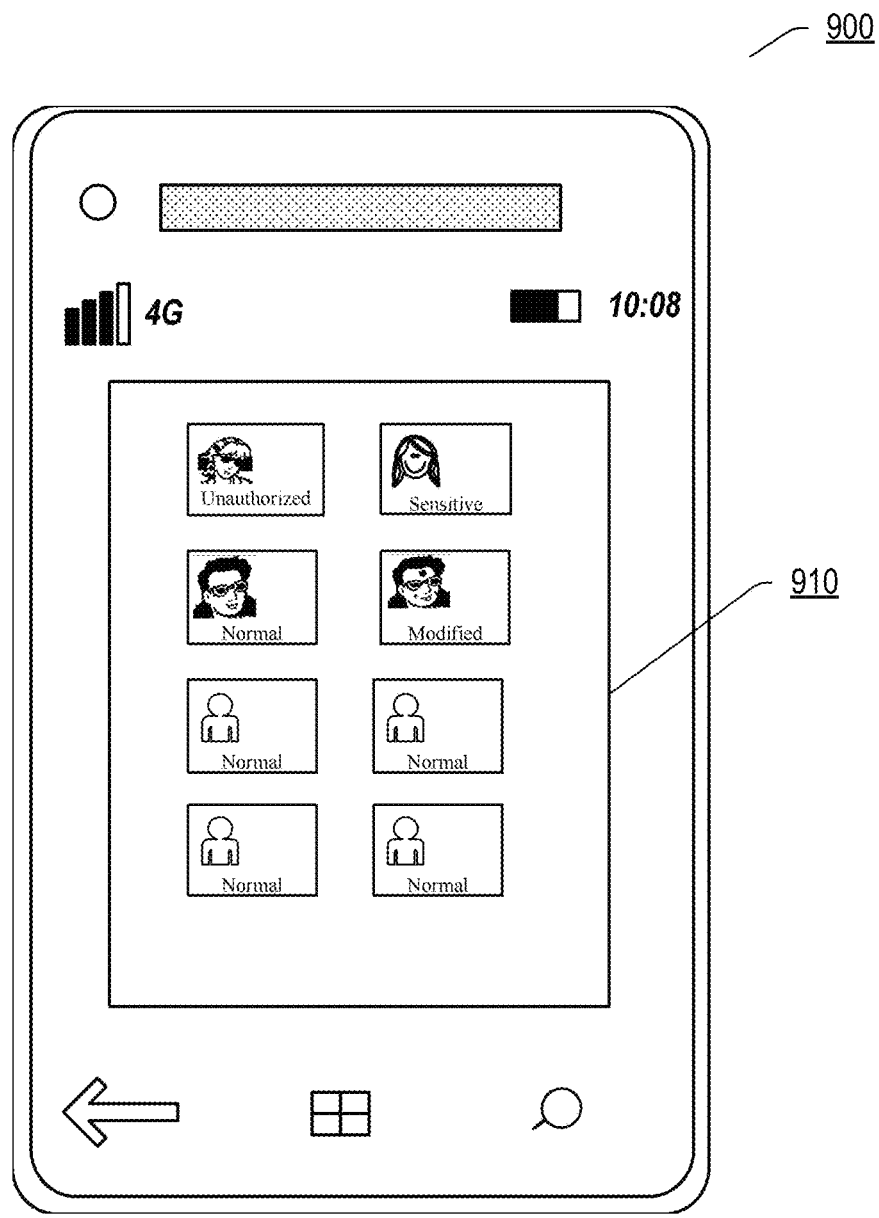
FIG. 9 illustrates an exemplary user interface for presenting images with privacy labels according to an embodiment.

At 710, images, each with privacy label, associated with the matched candidate entity may be provided from the "candidate entity images" portion in the corresponding entity index item to be presented to a user through a user interface, as shown in FIG. 9 below.

In some examples, the image may be provided along with at least one of the following: view-count, share-count, link to image source and publish chain. Herein, the view-count, share-count and link to image source for respective image may be obtained from the image source for the image. The publish chain for an image may be obtained as an ordered list of sites publishing the image.

Optionally, at 712, an indication for managing one or more images may be received. In some examples, the indication for managing the one or more images may comprise at least one of: an indication for deleting at least one image in the one or more images from specified image sources; an indication for monitoring view-count and/or share-count of at least one image in the one or more images; an indication for changing a privacy label of at least one image in the one or more images; and an indication for obtaining an image source of at least one image in the one or more images. Herein the indication for deleting may comprise an indication for deleting at least one image from all of sites showing the at least one image, or an indication for deleting at least one image from unauthorized sites showing the at least one image.

Figure 8:
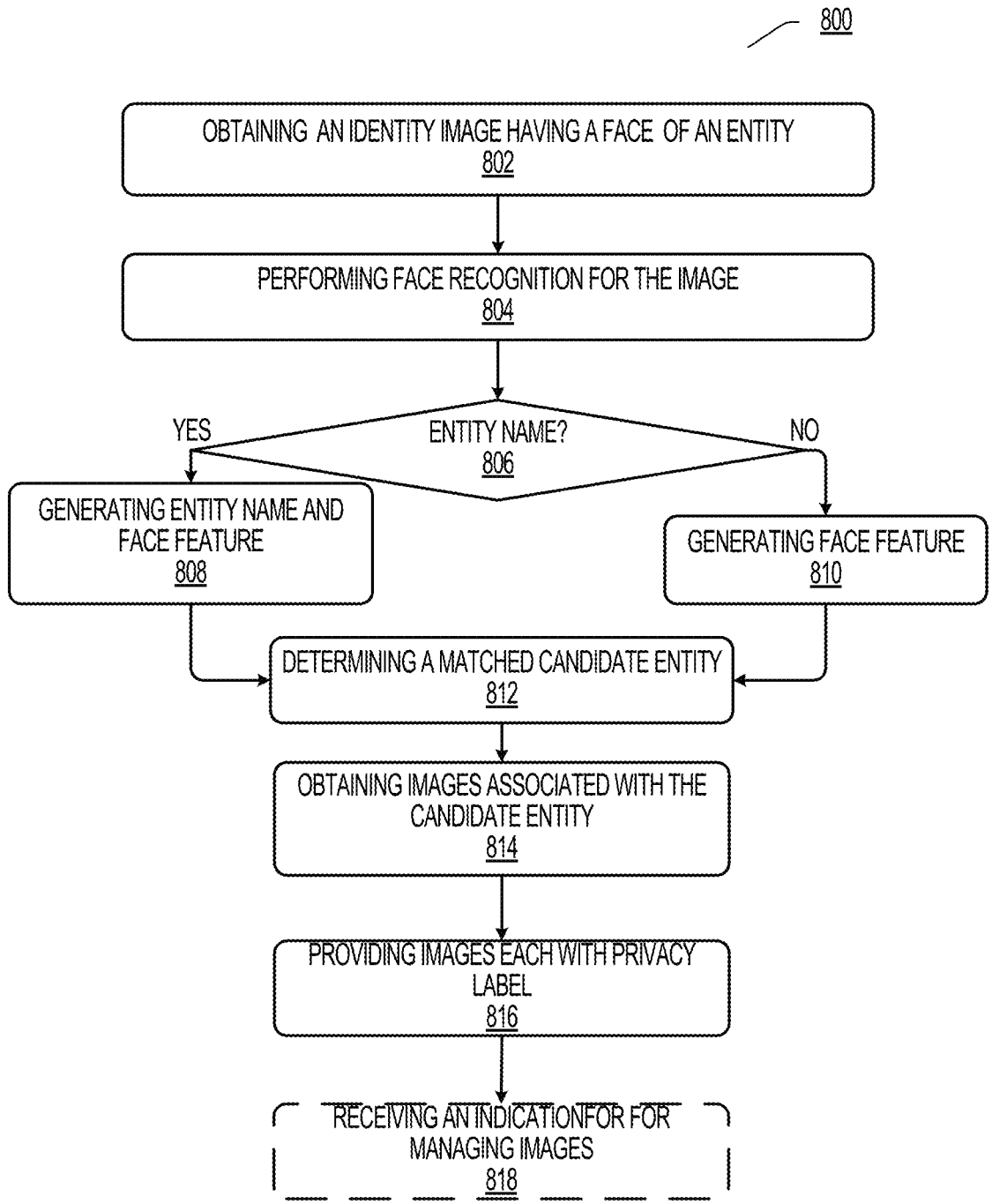
FIG. 8 illustrates another exemplary process for providing images with privacy label according to an embodiment.

FIG. 8 illustrates another exemplary process 800 for providing images with privacy label according to an embodiment. The exemplary process 800 may be performed based on identity image in the identity information provided, for example, from operation 606 in FIG. 6, and may implemented by an independent application, an application in coordination with a third party application, or a third party application. For example, the independent application may include an application dedicated for providing images with at least privacy label. The third party application may include social application, search application and so on, such as Bing, Facebook, Linkedin, Twitter, Instagram, etc.

At 802, identity image having a face of an entity may be obtained. Herein the identity image may be, for example but not limited to, a profile photo stored in a user profile for the entity, or captured from a user through a camera currently. In the latter case, the user may be the entity itself.

At 804, face recognition may be performed on the image through a face recognition model to generate an entity name. The face recognition model herein may be implemented by the face recognition model 400 described in connection with FIG. 4.

At 806, if an entity name can be generated through the face recognition on the image at 804, then the process may move to 808. Otherwise, the process may move to 810.

At 808, an entity name and face features for the face in the image may be generated. In some examples, the entity name may be represented in a form of keyword or feature vector. The face features may be represented in a form of feature vector.

At 810, if an entity name cannot be generated, face features for the face in the image may be generated.

In some examples, the entity name generation and/or the face feature generation may comprise compressing feature vectors through one or more ranking layer to a result set. The ranking layer may be implemented by, for example, product quantization algorithm.

At 812, a matched candidate entity may be determined based on the generated entity name and/or face feature. In some examples, the determination may be performed based on the entity name, which is similar to the operation 708 in FIG. 7. In some other examples, the determination may be performed based on the face feature, which may comprise: computing a feature vector difference between the face feature and a candidate entity image or a candidate profile photo in an entity index item; comparing the feature vector difference with a threshold; determining a candidate profile photo or one or more candidate entity images of which the feature vector difference being less than the threshold; determining at least one candidate entity corresponding to the candidate profile photo or candidate entity images as at least one matched candidate entity.

At 814, one or more images associated with the candidate entity may be obtained from the entity index database. In particular, the images may be obtained from the "candidate entity images" portion in the entity index database.

At 816, the one or more images associated with the matched candidate entity, each with privacy label, may be provided from the "candidate entity images" portion in the corresponding entity index item to be presented to a user through a user interface, as shown in FIG. 9 below.

In some examples, the image may be provided with at least one of the following: view-count, share-count, link to image source and publish chain. Herein, the view-count, share-count and link to image source for respective image may be obtained from the image source for the image. The publish chain for an image may be obtained as an ordered list of sites publishing the image.

Optionally, at 818, which may be similar to the operation 712 in FIG. 7, an indication for managing one or more images may be received. In some examples, the indication for managing the one or more images may comprise at least one of: an indication for deleting at least one image in the one or more images from specified image sources; an indication for monitoring view-count and/or share-count of at least one image in the one or more images; an indication for changing a privacy label of at least one image in the one or more images; and an indication for obtaining an image source of at least one image in the one or more images. Herein the indication for deleting may comprise an indication for deleting at least one image from all of sites showing the at least one image, or an indication for deleting at least one image from unauthorized sites showing the at least one image.

It should be appreciated that, although an entity name is shown here to be extracted from the identity description or from the obtained image through face recognition, it is just exemplary profile information, and any other profile information mentioned above may also be extracted and processed with or without the entity name.

It should be appreciated that, although it is described above that images with privacy label may be provided based on identity description and identity image for an entity separately, the images may also be provided based on the combination of them.

FIG. 9 illustrates an exemplary user interface 900 for presenting images with privacy labels according to an embodiment. Herein although the user interface 900 is embodied in a smart phone as an example, it may be embodied in any other terminal device, for example, desktop computers, laptops, tablets, AI terminals, etc.

The images may be presented with privacy label as an image set 810 for an entity, for example, image labelled unauthorized, image labelled sensitive, image labelled modified, and images labelled normal. The images may be shown as one by one, or may be shown in groups, for example, unauthorized group {image 1 . . . }, sensitive group { image 1 . . . }, normal group { image 1, image 2, image 3 . . . } and so on.

Figure 10:
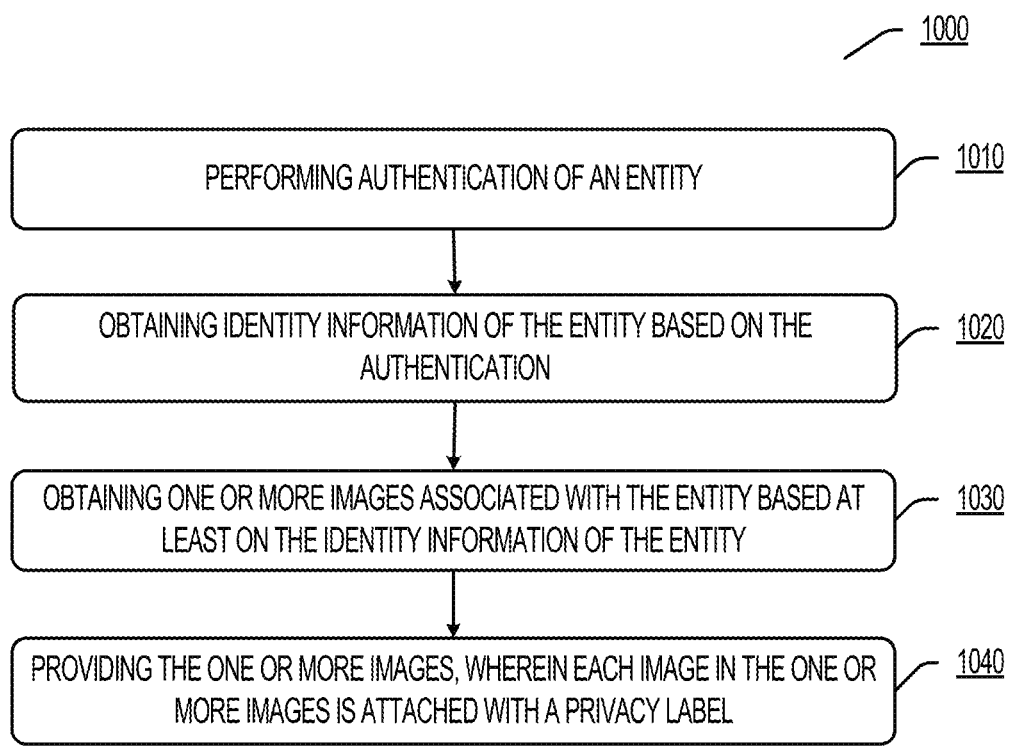
FIG. 10 illustrates a flowchart of an exemplary method for providing images according to an embodiment.

FIG. 10 illustrates a flowchart of an exemplary method 1000 for providing images according to an embodiment. The method 1000 may be implemented when a user wants to search or check images associated with an entity. In some examples, the user may be the entity. In some other examples, the user may be an agent of the entity.

At 1010, an authentication of an entity may be performed.

At 1020, identity information of the entity may be obtained based on the authentication.

At 1030, one or more images associated with the entity may be obtained based at least on the identity information of the entity.

At 1040, the one or more images may be provided, wherein each image in the one or more images is attached with a privacy label.

In an implementation, the privacy label identifies the image as at least one of: unauthorized category, sensitive category, modified category, and normal category.

In an implementation, the unauthorized category may indicate that the image is: not authorized to publish, published outside of a specified location, published outside of a specified time period, or published outside of a specified event. In other implementations, the sensitive category may indicate that the image includes sensitive content. In further implementations, the modified category may indicate that the image is generated through modifying an original image. In further implementations, the normal category may indicate that the image is an image except those identified as unauthorized, sensitive and modified.

In an implementation, the privacy label of each image may be determined based at least on at least one of: a rule associated with authorization state of each image, a rule associated with sensitive content contained in each image, and a rule associated with modification state of each image.

In an implementation, the obtaining one or more images associated with the entity may further comprise: determining, based on the identity information of the entity, a candidate entity matching the entity from an entity index database; and obtaining one or more images associated the candidate entity from the entity index database.

In an implementation, the entity index database may comprise a plurality of entity index items. In further implementation, each entity index item may comprise profile information and images associated with a respective candidate entity. In further implementation, the profile information may be created based at least on a knowledge graph, and the images associated with the respective candidate entity may be obtained from one or more image sources.

In an implementation, the identity information may comprise at least one of: identity description of the entity and identity image of the entity.

In an implementation, the authentication may be performed through at least one of: face liveness detection, authorization information verification and third-party authentication.

In an implementation, the method 1000 may further comprise receiving an indication for managing the one or more images.

In an implementation, the indication for managing the one or more images comprises at least one of: an indication for deleting at least one image in the one or more images from specified image sources; an indication for monitoring view-count and/or share-count of at least one image in the one or more images; an indication for changing a privacy label of at least one image in the one or more images; and an indication for obtaining an image source of at least one image in the one or more images.

In an implementation, the method 1000 may further comprise: obtaining view-count and/or share-count for respective image in the one or more images; and providing the view count and/or share count along with the respective image.

In an implementation, the method 1000 may further comprise: obtaining a link to image source for respective image in the one or more images; and providing the link to image source along with the respective image.

In an implementation, the method 1000 may further comprise: obtaining a publish chain for respective image in the one or more images; and providing the publish chain along with the respective image.

In an implementation, the method 1000 may be implemented by an independent application, an application in coordination with a third party application, or a third party application.

It should be appreciated that the method 1000 may further comprise any steps/processes for providing images according to the embodiments of the present disclosure as mentioned above.

Figure 11:
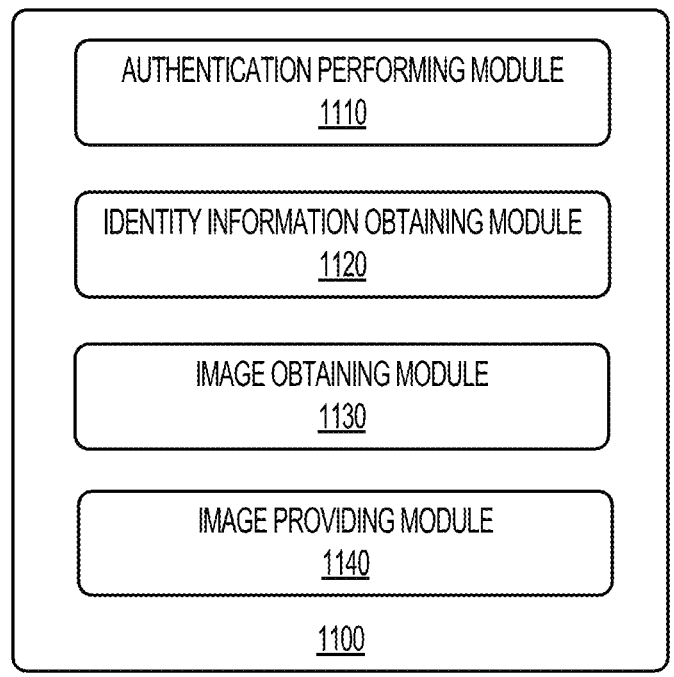
FIG. 11 illustrates an exemplary apparatus for providing images according to an embodiment.

FIG. 11 illustrates an exemplary apparatus 1100 for providing images according to an embodiment.

The apparatus 1100 may comprise: an authentication performing module 1110, for performing authentication of an entity; an identity information obtaining module 1120, for obtaining identity information of the entity based on the authentication; an image obtaining module 1130, for obtaining one or more images associated with the entity based at least on the identity information of the entity; and an image providing module 1140, for providing the one or more images, wherein each image in the one or more images is attached with a privacy label.

In an implementation, the privacy label identifies the image as at least one of: unauthorized category, sensitive category, modified category, and normal category.

In an implementation, the privacy label of each image is determined based at least on at least one of: a rule associated with authorization state of each image, a rule associated with sensitive content contained in each image, and a rule associated with modification state of each image.

In an implementation, the image obtaining module 1120 is further for: determining, based on the identity information of the entity, a candidate entity matching the entity from an entity index database; and obtaining one or more images associated the candidate entity from the entity index database.

In an implementation, the apparatus 1100 may further comprise an indication receiving module, for receiving an indication for managing the one or more images.

Moreover, the apparatus 1100 may also comprise any other modules configured for providing images according to the embodiments of the present disclosure as mentioned above.

Figure 12:
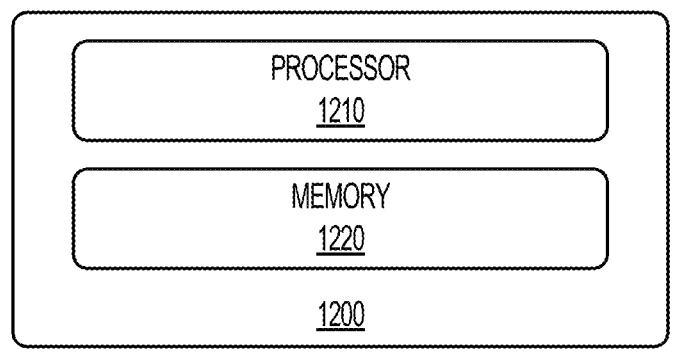
FIG. 12 illustrates another exemplary apparatus for providing images according to an embodiment.

FIG. 12 illustrates another exemplary apparatus 1200 for providing images according to an embodiment.

The apparatus 1200 may comprise at least one processor 1210. The apparatus 1200 may further comprise a memory 1220 that is connected with the processor 1210. The memory 1220 may store computer-executable instructions that, when executed, cause the processor 1210 to perform any operations of the methods for providing images according to the embodiments of the present disclosure as mentioned above.

The embodiments of the present disclosure may be embodied in a non-transitory computer-readable medium. The non-transitory computer-readable medium may comprise instructions that, when executed, cause one or more processors to perform any operations of the methods for assisting psychological cure in automated chatting according to the embodiments of the present disclosure as mentioned above.

It should be appreciated that all the operations in the methods described above are merely exemplary, and the present disclosure is not limited to any operations in the methods or sequence orders of these operations, and should cover all other equivalents under the same or similar concepts.

It should also be appreciated that all the modules in the apparatuses described above may be implemented in various approaches. These modules may be implemented as hardware, software, or a combination thereof. Moreover, any of these modules may be further functionally divided into sub-modules or combined together.

Processors have been described in connection with various apparatuses and methods. These processors may be implemented using electronic hardware, computer software, or any combination thereof. Whether such processors are implemented as hardware or software will depend upon the particular application and overall design constraints imposed on the system. By way of example, a processor, any portion of a processor, or any combination of processors presented in the present disclosure may be implemented with a microprocessor, microcontroller, digital signal processor (DSP), a field-programmable gate array (FPGA), a programmable logic device (PLD), a state machine, gated logic, discrete hardware circuits, and other suitable processing components configured to perform the various functions described throughout the present disclosure. The functionality of a processor, any portion of a processor, or any combination of processors presented in the present disclosure may be implemented with software being executed by a microprocessor, microcontroller, DSP, or other suitable platform.

Software shall be construed broadly to mean instructions, instruction sets, code, code segments, program code, programs, subprograms, software modules, applications, software applications, software packages, routines, subroutines, objects, threads of execution, procedures, functions, etc. The software may reside on a computer-readable medium. A computer-readable medium may include, by way of example, memory such as a magnetic storage device (e.g., hard disk, floppy disk, magnetic strip), an optical disk, a smart card, a flash memory device, random access memory (RAM), read only memory (ROM), programmable ROM (PROM), erasable PROM (EPROM), electrically erasable PROM (EEPROM), a register, or a removable disk. Although memory is shown separate from the processors in the various aspects presented throughout the present disclosure, the memory may be internal to the processors (e.g., cache or register).

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein. All structural and functional equivalents to the elements of the various aspects described throughout the present disclosure that are known or later come to be known to those of ordinary skill in the art are expressly incorporated herein by reference and are intended to be encompassed by the claims.

What is claimed is:

1. A method for providing images, comprising:
performing authentication of an entity;
obtaining identity information of the entity based on the authentication;
obtaining one or more images associated with the entity based at least on the identity information of the entity, the entity being associated with a first feature vector having a first feature vector length;
determining, based on the identity information of the entity, a candidate entity matching the entity, the candidate entity being associated with a second feature vector having a second feature vector length, the determination being made based on a comparison of the first feature vector length with the second feature vector length;
determining categories of the one or more images, wherein the categories include an authorization category, a modification category, and a sensitive data category;
attaching a privacy label to each image of the one or more images based on the determined categories of the one or more images;
obtaining a publish chain that includes a source for each image of the one or more images and cascading links from the source, the cascading links indicating a path of an image from the source; and
providing the one or more images with the attached privacy label and the publish chain.

2. The method of claim 1, wherein the privacy label identifies the image as at least one of: unauthorized category, sensitive category, and modified category.

3. The method of claim 2, wherein:
the unauthorized category indicates that the image is:
not authorized to publish, published outside of a specified location, published outside of a specified time period, or published outside of a specified event;
the sensitive category indicates that the image includes sensitive content; and
the modified category indicates that the image is generated through modifying an original image.

4. The method of claim 1, wherein the privacy label of each image is determined based at least on at least one of: a rule associated with authorization state of each image, a rule associated with sensitive content contained in each image, and a rule associated with modification state of each image.

5. The method of claim 1, wherein the obtaining one or more images associated with the entity further comprises:
obtaining one or more images associated the candidate entity from an entity index database.

6. The method of claim 5, wherein the entity index database comprises a plurality of entity index items, each entity index item comprising profile information and images associated with a respective candidate entity, and wherein the profile information is created based at least on a knowledge graph, and the images associated with the respective candidate entity are obtained from one or more image sources.

7. The method of claim 1, wherein the identity information comprises at least one of: identity description of the entity and identity image of the entity.

8. The method of claim 1, wherein the authentication is performed through at least one of: face liveness detection, authorization information verification and third-party authentication.

9. The method of claim 1, further comprising:
obtaining view-count and/or share-count for respective image in the one or more images; and
providing the view-count and/or share-count along with the respective image.

10. The method of claim 1, further comprising:
obtaining a link to an image source for a respective image in the one or more images; and
providing the link to image source along with the respective image.

11. The method of claim 1, wherein the publish chain also includes an order in which the image will be successively published on different sites.

12. The method of claim 1, wherein the method is implemented by an independent application, an application in coordination with a third party application, or a third party application.

13. An apparatus for providing images, comprising:
a processor:
an authentication performing module, for performing authentication of an entity;
an identity information obtaining module, for obtaining identity information of the entity based on the authentication;
an image obtaining module, for obtaining one or more images associated with the entity based at least on the identity information of the entity, the entity being associated with a first feature vector having a first feature vector length;
a module for determining, based on the identity information of the entity, a candidate entity matching the entity, the candidate entity being associated with a second feature vector having a second feature vector length, the determination being made based on a comparison of the first feature vector length with the second feature vector length;

a module for determining categories of the one or more images, wherein the categories include an authorization category, a modification category, and a sensitive data category;

a module for attaching a privacy label to each image of the one or more images based on the determined categories of the one or more images;

a publish chain module for obtaining a publish chain that includes a source for each image of the one or more images and cascading links from the source, the cascading links indicating a path of an image from the source; and an image providing module, for providing the one or more images with the attached privacy label and the publish chain;

wherein the modules are executed on the processor.

14. The apparatus of claim 13, wherein the privacy label identifies the image as at least one of: unauthorized category, sensitive category, and modified category.

15. The apparatus of claim 13, wherein the privacy label of each image is determined based at least on at least one of: a rule associated with authorization state of each image, a rule associated with sensitive content contained in each image, and a rule associated with modification state of each image.

16. The apparatus of claim 13, wherein the image obtaining module is further for:

determining, based on the identity information of the entity, a candidate entity matching the entity from an entity index database; and obtaining one or more images associated the candidate entity from the entity index database.

17. An apparatus for providing images, comprising:

one or more processors; and a memory storing computer-executable instructions that, when executed, cause the one or more processors to:

perform authentication of an entity;

obtain identity information of the entity based on the authentication;

obtain one or more images associated with the entity based at least on the identity information of the entity, the entity being associated with a first feature vector having a first feature vector length;

determine, based on the identity information of the entity, a candidate entity matching the entity, the candidate entity being associated with a second feature vector having a second feature vector length, the determination being made based on a comparison of the first feature vector length with the second feature vector length;

determine categories of the one or more images, wherein the categories include an authorization category, a modification category, and a sensitive data category;

attach a privacy label to each image of the one or more images based on the determined categories of the one or more images;

obtain a publish chain that includes a source for each image of the one or more images and cascading links from the source, the cascading links indicating a path of an image from the source and provide the one or more images with the attached privacy label and the publish chain.

* * * * *